US009429765B2

(12) United States Patent
Park (10) Patent No.: US 9,429,765 B2
(45) Date of Patent: Aug. 30, 2016

(54) IMAGE PROJECTION APPARATUS
(71) Applicant: LG ELECTRONICS INC., Seoul (KR)
(72) Inventor: Jun Park, Gyeonggi-Do (KR)
(73) Assignee: LG ELECTRONICS INC., Seoul (KR)
( * ) Notice: Subject to any disclaimer, the term of this patent is extended or adjusted under 35 U.S.C. 154(b) by 375 days.
(21) Appl. No.: 13/803,790
(22) Filed: Mar. 14, 2013
(65) Prior Publication Data
US 2013/0265550 A1 Oct. 10, 2013
(30) Foreign Application Priority Data Apr. 10, 2012 (KR) .................. 10-2012-0037526

(51) Int. Cl.
*G02B 27/26* (2006.01)
*G03B 21/14* (2006.01)
*G03B 21/20* (2006.01)
*H04N 13/04* (2006.01)
(52) U.S. Cl.
CPC ........... *G02B 27/26* (2013.01); *G03B 21/2073* (2013.01); *H04N 13/0434* (2013.01); *H04N 13/0438* (2013.01); *H04N 13/0459* (2013.01)
(58) Field of Classification Search
CPC .................................................. G02B 27/26
USPC ........ 353/7, 8, 20; 352/62; 349/15; 359/465; 348/57, 58
See application file for complete search history.

(56) References Cited

U.S. PATENT DOCUMENTS

| 6,257,726 | B1 * | 7/2001 | Okuyama | G02B 27/283 348/E5.137 |
| 6,582,080 | B2 * | 6/2003 | Gibbon | H04N 9/3197 348/E9.027 |
| 6,707,516 | B1 * | 3/2004 | Johnson et al. | 349/78 |
| 7,083,282 | B1 * | 8/2006 | Sharp et al. | 353/20 |
| 7,429,111 | B2 * | 9/2008 | Ockenfuss | 353/20 |
| 8,408,708 | B2 * | 4/2013 | Sharp | 353/7 |
| 2004/0240777 | A1 | 12/2004 | Woodgate et al. | 385/16 |
| 2005/0190345 | A1 * | 9/2005 | Dubin et al. | 353/85 |
| 2005/0237487 | A1 * | 10/2005 | Chang | 353/7 |
| 2006/0038964 | A1 * | 2/2006 | Lu et al. | 353/84 |
| 2010/0110166 | A1 * | 5/2010 | Chang | 348/57 |
| 2011/0205496 | A1 * | 8/2011 | Schuck et al. | 353/8 |
| 2011/0285963 | A1 * | 11/2011 | Kurtz | G02B 27/18 353/8 |
| 2013/0016321 | A1 * | 1/2013 | Duelli et al. | 353/20 |
| 2014/0055754 | A1 * | 2/2014 | Chuang et al. | 353/20 |

FOREIGN PATENT DOCUMENTS

| CN | 1623334 A | 6/2005 |
| CN | 101937133 A | 1/2011 |

OTHER PUBLICATIONS

Chinese Office Action issued in application No. 201310123268.X dated Nov. 4, 2014.

* cited by examiner

*Primary Examiner* — William C Dowling
(74) *Attorney, Agent, or Firm* — Ked & Associates, LLP (57) ABSTRACT

The present disclosure may provide an image projection apparatus including a light source configured to generate a light bundle, a display element configured to form an image using the light bundle, and a illumination system disposed between the light source and the display element, wherein the illumination system includes a plurality of lenses disposed to illuminate the light bundle to the display element, and a polarization forming unit disposed between the plurality of lenses to convert the light bundle into polarized light in the illumination system so as to implement stereoscopic images.

17 Claims, 7 Drawing Sheets

BRIGHTNESS: 5391.497lm
UNIFORMITY: 76.78%

FIG. 7B

BRIGHTNESS: 5355.384lm
UNIFORMITY: 77.03%

FIG. 8

IMAGE PROJECTION APPARATUS

CROSS-REFERENCE TO RELATED APPLICATION(S)

This application claims priority under 35 U.S.C. §119 to Korean Application No. 10-2012-0037526 filed in Korea on Apr. 10, 2012, whose entire disclosure is hereby incorporated by reference.

BACKGROUND

1. Field

The present disclosure relates to an image projection apparatus for magnifying and projecting a generated image to the outside.

2. Background

Image projection apparatuses for magnifying and projection a generated image are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

With the rapid development of the information age, the importance of display systems for implementing a large screen has been emphasized. As an example of apparatuses of implementing such a large screen, there is an image projection apparatus having a function of magnifying and projecting an image. The image projection apparatus refers to an apparatus for implementing an image using light emitted from the light source, and projecting the implemented image, and the representative examples include a projector, a projection television, and the like.

In recent years, attempts for implementing stereoscopic images have been applied to the image projection apparatus to implement images close to reality. The method of implementing stereoscopic images in an image projection apparatus may be divided into two types. One is a shutter glass (SG) scheme which is a method of sequentially reproducing left and right eye images to implement a solid image through synchronized 3D glasses, and the other one is a film patterned retarder (FPR) scheme which is a method of generating a difference between left and right eye phases using a circular polarized shutter to recognize a stereoscopic image in human brain through polarized 3D glasses. However, such schemes using the existing circular polarized shutter have had disadvantages of increasing the size of its optical system, and thus the measures for solving this problem may be attempted.

The present disclosure is to implement an optical system for implementing stereoscopic images in an image projection apparatus in spite of its compact configuration.

Furthermore, the present disclosure is to enhance the optical performance of an image projection apparatus during the implementation of stereoscopic images using a 3D shutter.

In order to accomplish the foregoing task, an image projection apparatus according to an embodiment of the present disclosure may include a light source configured to generate a light bundle, a display element configured to form an image using the light bundle, and a illumination system disposed between the light source and the display element, wherein the illumination system includes a plurality of lenses disposed to illuminate the light bundle to the display element, and a polarization forming unit disposed between the plurality of lenses to convert the light bundle into polarized light in the illumination system so as to implement stereoscopic images.

As an example associated with the present disclosure, the illumination system may further include a concave lens disposed at a front side of the polarization forming unit on the path of the light bundle to reduce an incident angle of the light bundle to the polarization forming unit.

The plurality of lenses may be disposed to form a stop, and the concave lens may be disposed at a front side of the stop on the path of the light bundle. The polarization forming unit may be formed in a movable manner, and inserted into the location of the stop by the movement. The incident angle of the stop may be formed at 1 to 5.3 degrees by the concave lens.

The plurality of lenses may include at least one convex lens disposed between the concave lens and the polarization forming unit.

As another example associated with the present disclosure, the polarization forming unit may be formed to sequentially convert the light bundle into circular polarized lights in different directions from one another. The polarization forming unit may include a circular polarized shutter with a film patterned retarder (FPR) scheme.

As still another example associated with the present disclosure, the illumination system may include a plurality of mirrors disposed adjacent to one another, and the plurality of mirrors may be disposed between the polarization forming unit and the display element. The polarization forming unit may be disposed at an opposite side to a projection system for magnifying and projecting the image by interposing a light bundle proceeding toward the plurality of mirrors during the implementation of two-dimensional images.

Hereinafter, an image projection apparatus associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

Figure 1:
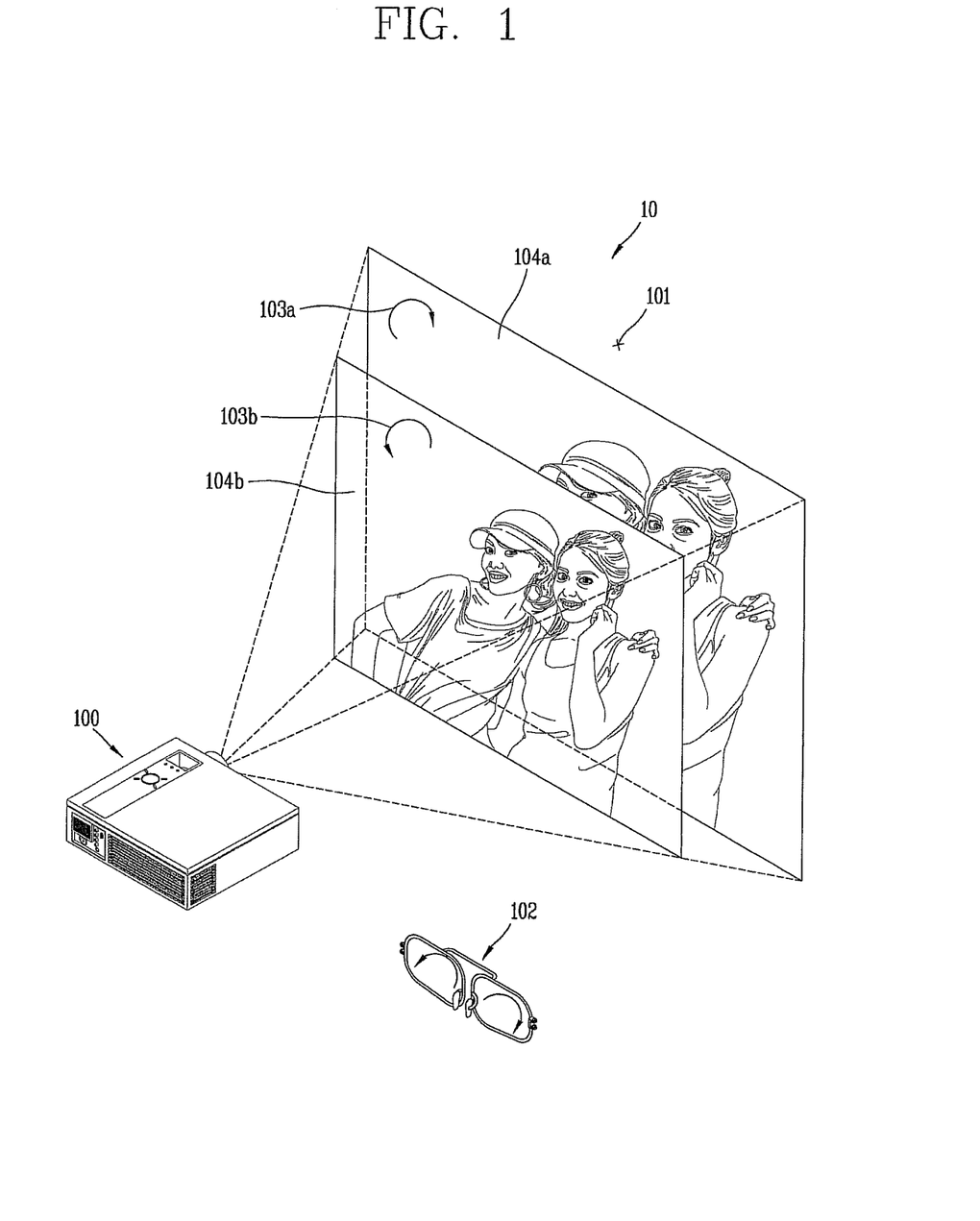
FIG. 1 is a perspective view illustrating a display system according to an embodiment of the present disclosure.

FIG. 1 is a perspective view illustrating a display system 10 according to an embodiment of the present disclosure.

The display system 10 according to the present disclosure may include an image projection apparatus 100 disposed to implement stereoscopic images, a screen unit 101, and a polarized glasses unit 102.

As an apparatus for implementing an image using light generated from a light source and projecting the implemented image on the screen, the image projection apparatus 100 may be a projector or the like for magnifying and projecting an image as illustrated in the drawing. Hereinafter, the image projection apparatus 100 associated with the present disclosure will be described on the basis of a projector. However, the image projection apparatus 100 may not only be limited to this, but also applicable to a projection apparatus integrated into a projection television, and the like, for example.

The image projection apparatus 100 may be formed to project both a first and a second image 104a, 104b having different polarized directions 103a, 103b. The polarized lights having the different polarized directions may be referred to as a first and a second polarized light 103a, 103b, respectively. The first and the second polarized light 103a, 103b may be circular polarized lights rotated in different directions from each other, respectively.

The first and the second image 104a, 104b may be formed to have binocular parallex forming stereoscopic images. In other words, the first and the second image 104a, 104b may be left and right eye images, respectively. However, the present disclosure may not only be limited to this, and the first and the second image 104a, 104b may be also right and left eye images, respectively.

The screen unit 101 displays an image magnified and projected from the image projection apparatus 100 as a screen. The screen unit 101 is disposed at a location crossed with a projection direction of the image projection apparatus 100 on which the left and the right eye image 104a, 104b are projected. The screen unit 101 may be a wall surface, an achromatic or silver-colored film, or the like. The screen unit 101 may be a polarization maintaining screen formed to maintain a polarized state.

The polarized glasses unit 102 is formed with polarizing plates corresponding to different circular polarized lights 103a, 103b, respectively. Through this, the left and the right eye image 104a, 104b having binocular parallex, respectively, reach the user's left and right eyes. Accordingly, the user can view stereoscopic images.

Figure 2A:
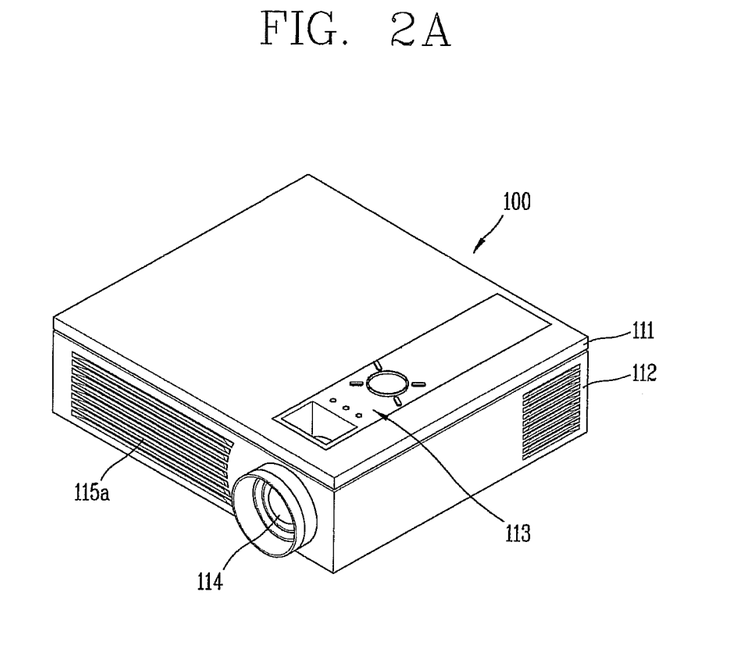
FIGS. 2A and 2B are front and rear perspective views, respectively, illustrating an image projection apparatus in FIG. 1.
Figure 2B:
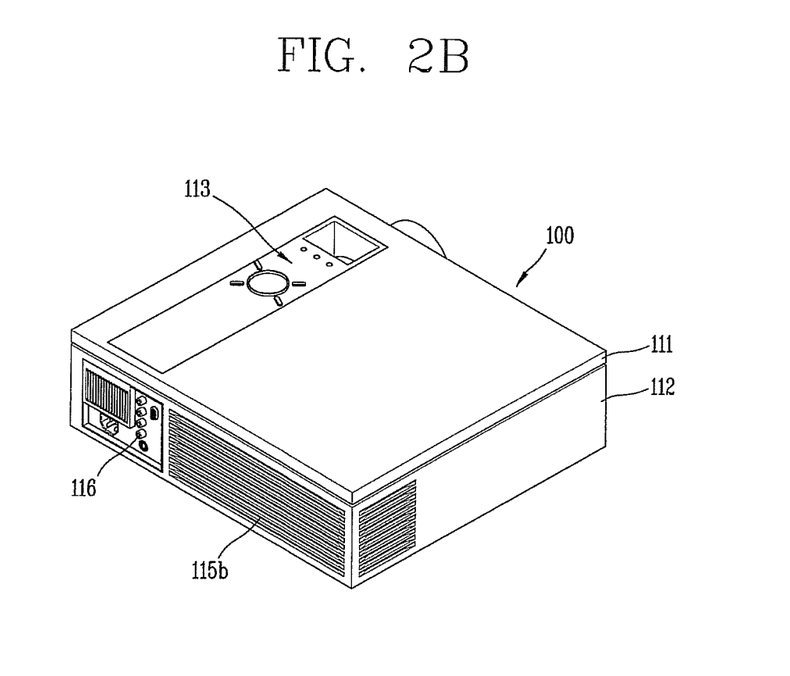

Hereinafter, an image projection apparatus capable of implementing the stereoscopic images will be described as an example. FIGS. 2A and 2B are front and rear perspective views, respectively, illustrating an image projection apparatus in FIG. 1.

A case (casing, housing, cover, etc.) constituting an external appearance of the body of the image projection apparatus 100 may be formed by an upper and a lower case 111, 112. Various optical elements and electronic elements are integrated into a space formed by the upper and the lower case 111, 112.

A manipulation unit 113 or the like may be disposed at the upper case 111. The manipulation unit 113 may be formed to allow the user to enter a control command such as start, end, zoom-in, zoom-out, focusing, and the like, and any method can be employed if it is a tactile manner allowing the user to perform manipulation with a tactile feeling.

A projection unit 114, a first and a second air flow unit 115a, 115b, an interface 116, and the like may be disposed at the lower case 112. The projection unit 114 may be formed to magnify an image projected from the image projection apparatus 100.

The first and the second air flow unit 115a, 115b are made of a plurality of through holes such that air can flow into the image projection apparatus. Through this, it may be possible to implement the cooling of the image projection apparatus using forced convection.

The interface 116 may be a path for allowing the image projection apparatus 100 to exchange data with external devices. Image data corresponding to an image to be projected from the image projection apparatus 100 may be received from the outside through the interface 116. Referring to the drawing, the interface 116 may include a connection terminal that can be electrically connected to an electronic device, such as a computer, a DVD player, or the like, capable of supplying image or audio data.

Figure 3:
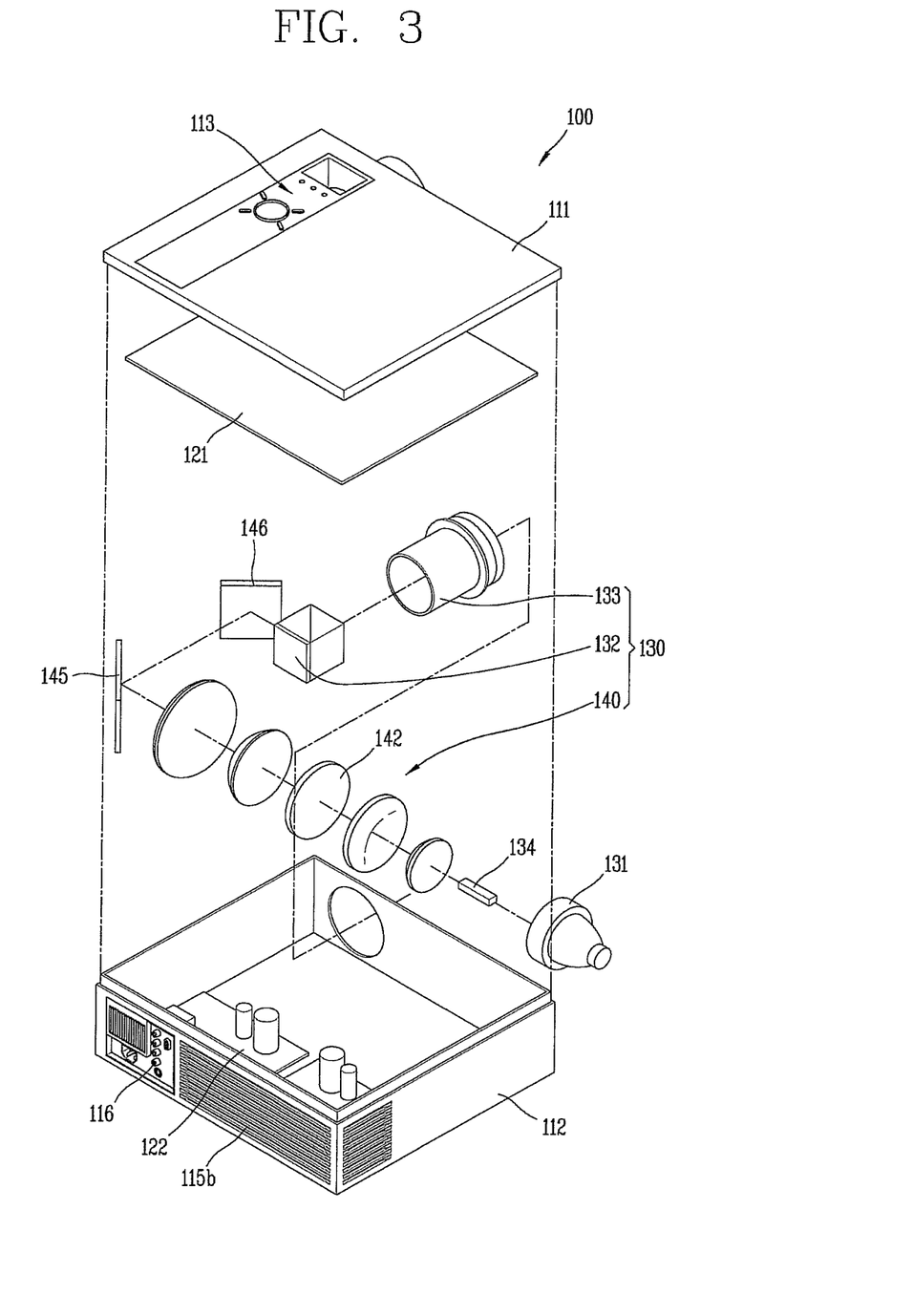
FIG. 3 is an exploded view illustrating an image projection apparatus in FIG. 1.

Hereinafter, a mechanism capable of implementing stereoscopic images in an image projection apparatus having the foregoing structure will be described in more detail. FIG. 3 is an exploded view illustrating an image projection apparatus 100 in FIG. 1, and FIG. 4 is a conceptual view schematically illustrating an optical system in FIG. 3.

Figure 4:
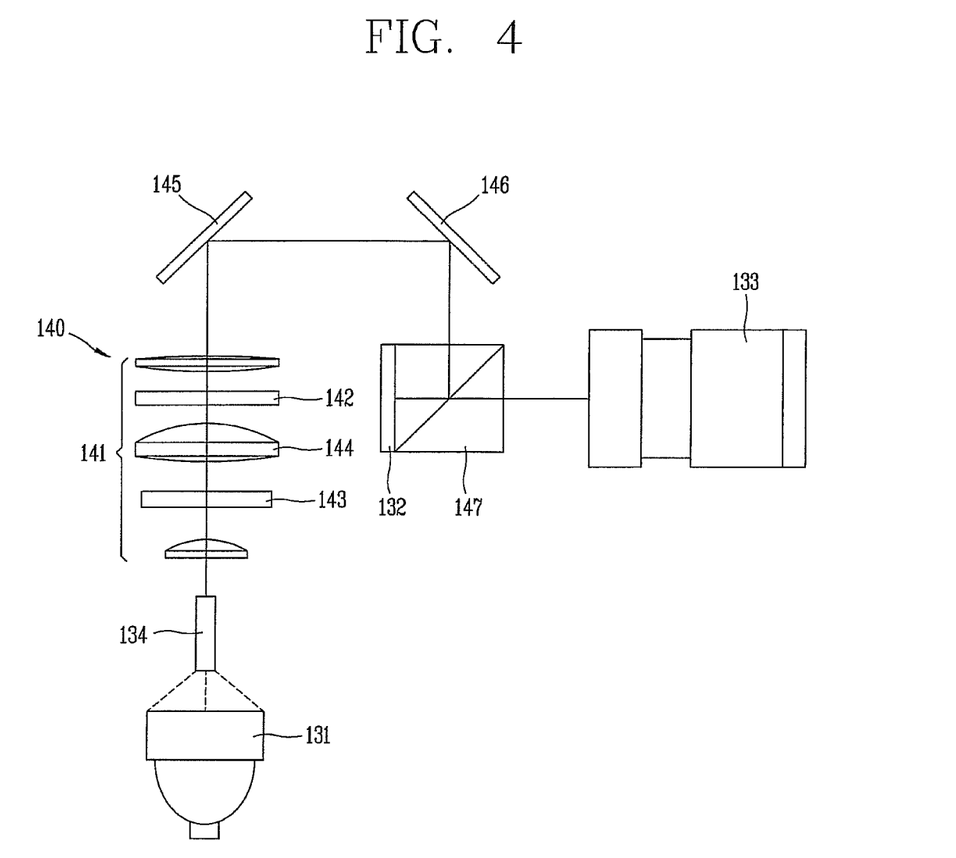
FIG. 4 is a conceptual view schematically illustrating an optical system in FIG. 3.

Referring to FIGS. 3 and 4, a control circuit board 121 and a power board 122 may be mounted in the lower case 112. The control circuit board 12 may be configured as an example of the controller for operating various functions of the image projection apparatus 100. The power board 122 receives an alternating current power source or the like and converts it into a direct current power source required to drive the image projection apparatus 100.

Furthermore, an optical system 130 arranged with optical elements such as lenses to form an image and project the image to the outside may be mounted in the lower case 112. A structure (not shown) into which the optical system 130 can be assembled may be additionally disposed between the optical system 130 and the lower case 112.

The optical system 130 may include an optical source 131, a illumination system 140, a display element 132, and a projection system 133.

As an apparatus for receiving electrical energy and converting it into light energy, the optical source 131 may be formed to generate light. The optical source 131 may be a ultra high voltage (UHV) lamp, a light emitting diode (LED), a laser diode (LD), and the like, for example. A stabilizer for stabilizing electricity supplied to the optical source 131, a cooling fan for generating forced convection, and the like may be mounted in the lower case 112 to assist the operation of the optical source 131.

The illumination system 140 may be disposed adjacent to the optical source 131 to illuminate a light bundle generated from the optical source 131 in a predetermined direction. The illumination system 140 refers to a system in which optical elements such as lenses are disposed to form a group with a predetermined arrangement. Furthermore, the illumination system 140 is formed to sequentially convert the light bundle into circular polarized lights 103a, 103b (refer to FIG. 1) having different rotational directions from each other. To this end, a polarization forming unit 142 is inserted and disposed between a plurality of lenses 141 of the illumination system. In this manner, the polarization forming unit 142 may be inserted into a space between lenses, and thus it may be possible to maintain the size of the optical system in a compact manner. The illumination system 140 may be a lens assembly.

The display element 132 forms left and right eye images using circular polarized lights 103a, 103b. More specifically, the display element 132 may be controlled to reflect incident polarized light to form an image. Specifically, the display element 132 reflects a light bundle entered to correspond to left and right eye images to be implemented in an independent manner on a plurality of micro mirrors. The electronic element may be a digital micromirror device (DMD) in which micro mirrors whose tilt angles are changed to an ON or OFF state according to a control signal are arranged in a lattice structure on a plane, for example. Furthermore, the electronic element may be a liquid crystal on silicon (LCOS) panel that can reflect light to implement an image, among liquid crystal display devices. The display element 132 may be referred to as a display panel, display chip, display array, display device, or the like. Moreover, the display element 132 may include a plurality of display devices.

The projection system 133 may be configured to magnify and project an image formed in the display element 132. The projection system 133 may form a projection unit 114 (refer to FIG. 2A) in which lenses and a structure for supporting the lenses are combined with each other. The projection unit 114 may include a projection lens.

Taking the illumination system 140 into consideration again, the illumination system 140 may be disposed between the optical source 131 and the display element 132 to perform the illumination and polarization of a light bundle. Hereinafter, the illumination system will be described in more detail with reference to FIGS. 5 and 6.

Figure 5:
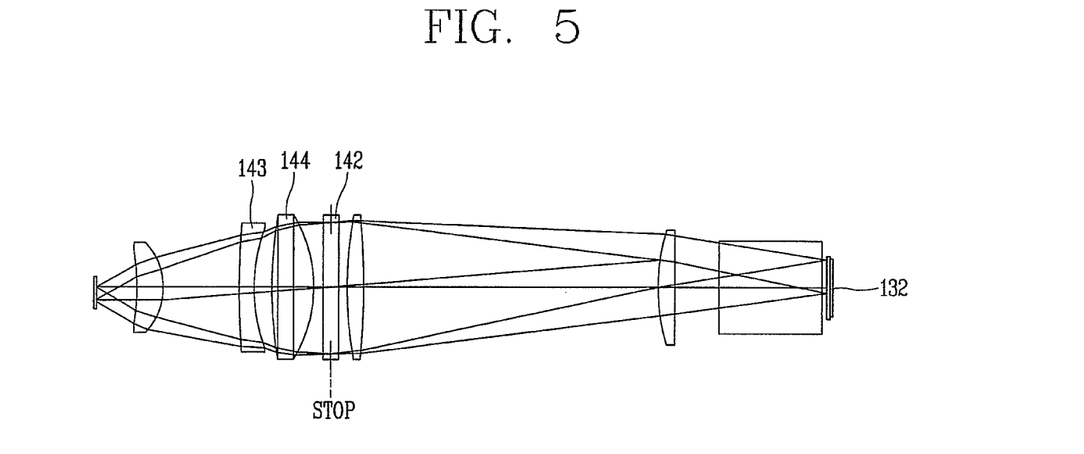
FIG. 5 is an enlarged view illustrating light advancement in a illumination system in FIG. 4.
Figure 6:
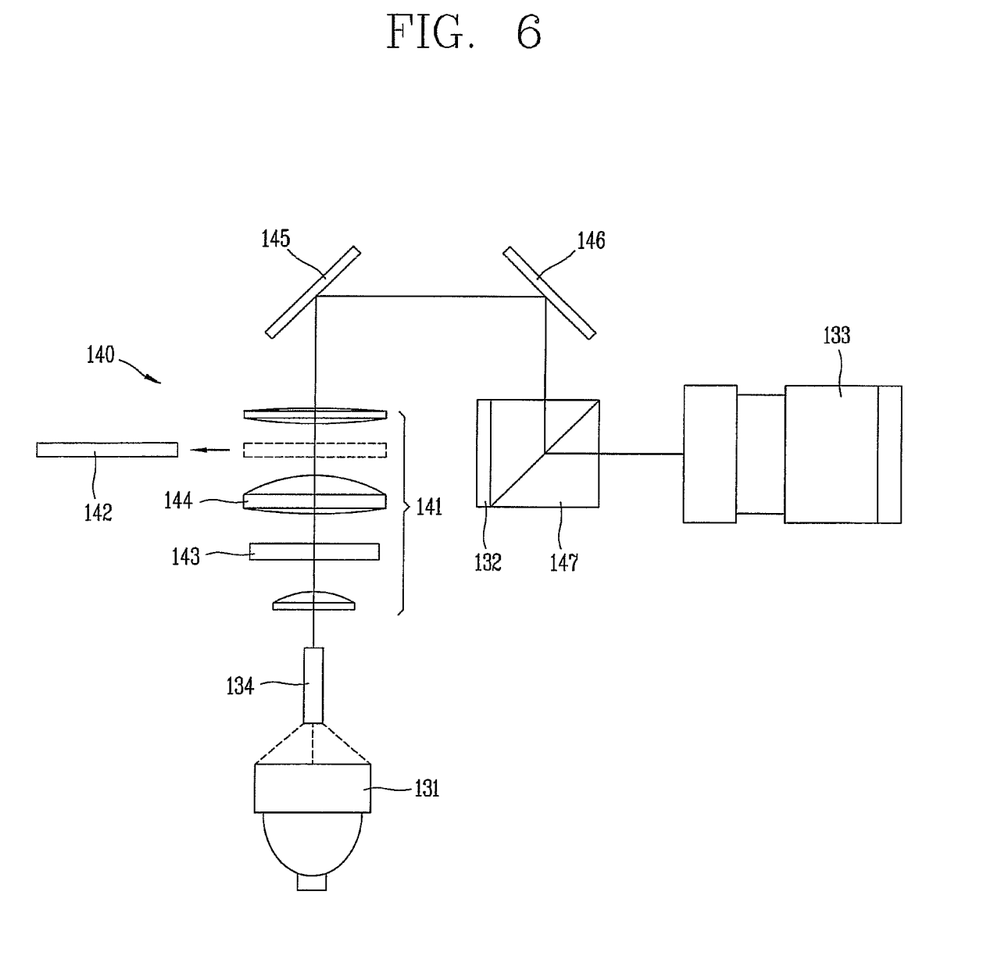
FIG. 6 is a conceptual view illustrating a configuration in which the polarization forming unit is moved in a illumination system in FIG. 4.
Figure 7A:
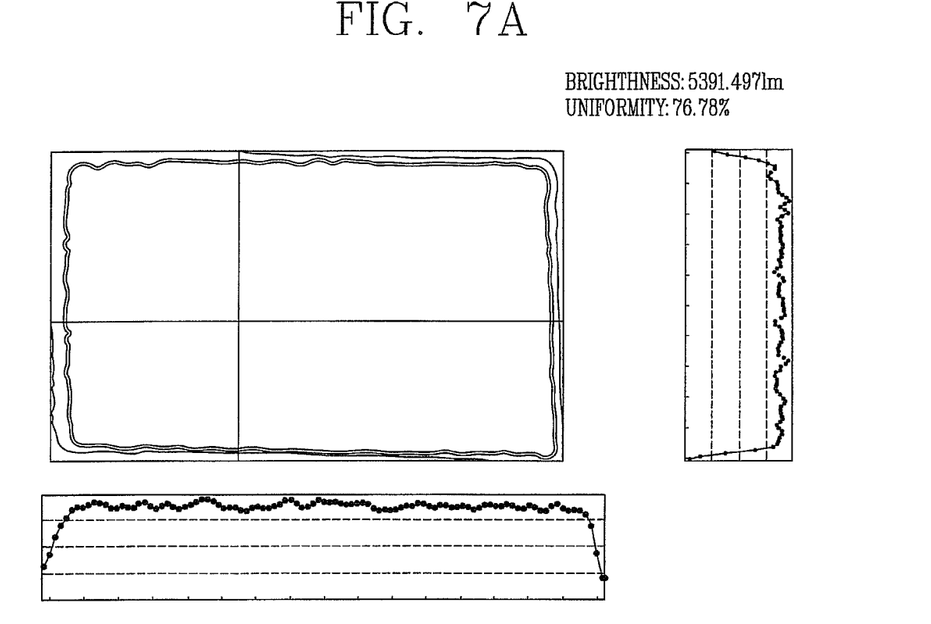
FIGS. 7A and 7B are simulation results illustrating an optical performance prior to and subsequent to the insertion of the polarization forming unit.
Figure 7B:
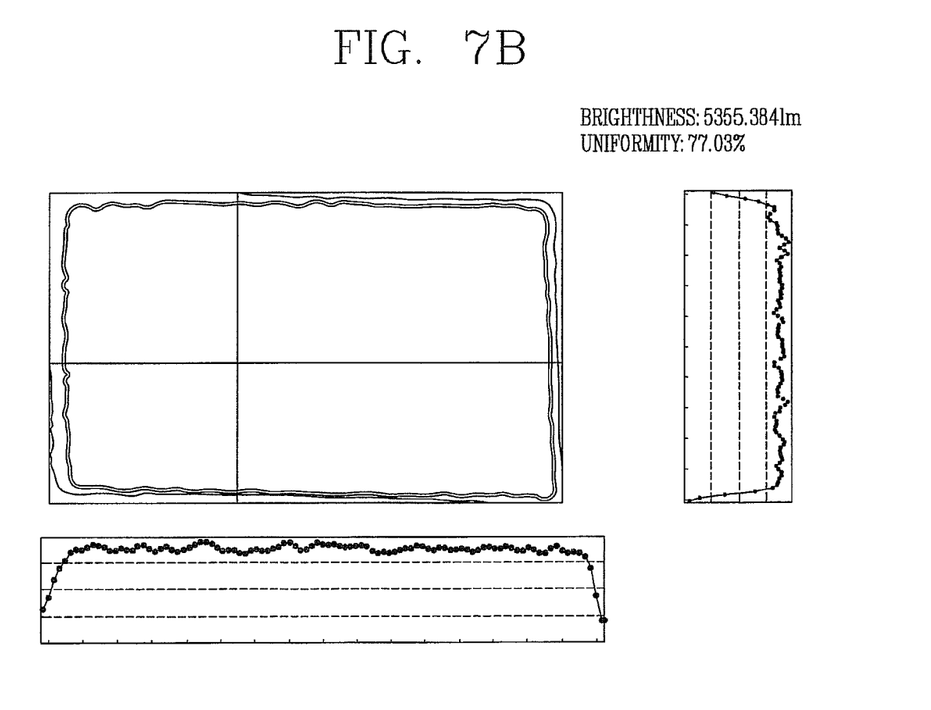

FIG. 5 is an enlarged view illustrating light advancement in the illumination system 140 in FIG. 4, and FIG. 6 is a conceptual view illustrating a configuration in which the polarization forming unit is moved in the illumination system in FIG. 4, and FIGS. 7A and 7B are simulation results illustrating an optical performance and subsequent to the insertion of the polarization forming unit. The polarization forming unit 142 may also be referred to herein as a polarizing optical device or a polarizing lens.

Referring to FIG. 5, a plurality of lenses 141 are disposed to illuminate a light bundle generated from the light source to the display element 132. Furthermore, a light integrator 134 may be disposed between the plurality of lenses 141 and the optical source 131. The light integrator 134 is disposed at a location on which light reflected from the reflector of the optical source 131 is converged, and performs the role of allowing light to be uniformly distributed and advancing the uniformly distributed light into the plurality of lenses 141. The light integrator 134 may be a light tunnel, an integrator, or the like, and through this, the distribution of the light bundle luminance becomes uniform.

A light bundle that has passed through the light integrator 134 is refracted again by the plurality of lenses 141 to match to the size of the display element 132. For such an example, the plurality of lenses 141 are composed of concave and convex lenses to form a stop.

The polarization forming unit 142 may be disposed between the plurality of lenses to convert the light bundle into polarized light in the illumination system 140 to implement stereoscopic images. More specifically, the polarization forming unit 142 may be formed to sequentially convert the light bundle into circular polarized lights in different directions from one another, and for such an example, the polarization forming unit 142 may include a circular polarized shutter with a film patterned retarder (FPR) scheme. However, the present disclosure may not only be limited to this, and the polarization forming unit 142 may be a linear polarized shutter.

According to the drawing, the polarization forming unit 142 is disposed at a location of the stop. If an incident angle of the stop is greater than 10 degrees, then the optical efficiency of a illumination system will be reduced by the polarization forming unit 142 located at the stop. According to the present disclosure, the incident angle of the stop may be formed within a range of 1 to 5.3 degrees to maintain the optical efficiency of the illumination system 140.

More specifically, the illumination system 140 may include a concave lens 143 disposed at a front side of the polarization forming unit 142 on the path of the light bundle to reduce an incident angle of the light bundle to the polarization forming unit 142. In other words, the concave lens 143 is disposed at a front side of the stop on the path of the light bundle such that any one of the plurality of lenses 141 is disposed adjacent to a front side of the polarization forming unit 142. Any one convex lens 144 of the plurality of lenses 141 may be disposed between the concave lens 143 and the polarization forming unit 142. In this case, light is refracted in the direction of being diverged by the concave lens 143 prior to being refracted in the direction of being converged by the convex lens 144, and through this, an incident angle of the stop may be formed at 1 to 5.3 degrees.

Because of a small incident angle, even when a circular polarized shutter is inserted therein, there is little chance of lighting margin reduction and brightness efficiency reduction due to this.

Referring to FIG. 6, an optical system according to the present disclosure may be formed to implement two-dimensional images as well as stereoscopic images. More specifically, the polarization forming unit 142 may be formed in a movable manner, and thus inserted into or released from the location of the stop by the movement. In this manner, the polarization forming unit 142 can be moved, thereby obtaining an advantage that there is no optical efficiency reduction due to the use of the polarization forming unit 142 while viewing two-dimensional images.

FIGS. 7A and 7B are simulation results for illumination shape prior to and subsequent to the insertion of a circular polarized shutter, respectively. Referring to the drawings, it is seen that a difference between their illumination shape and luminance prior to and subsequent to the insertion of the polarization forming unit 142 is a level of simulation error, and thus there is almost no difference. Accordingly, it may be possible to implement stereoscopic images without a dummy glass requiring additional cost and configuration space.

In this manner, when the polarization forming unit 142 is moved, the movement space of the polarization forming unit 142 may be required, thereby increasing the size of an optical system. Referring to FIGS. 4 and 6, there is disclosed an optical system capable of securing the movement space of the polarization forming unit 142 without increasing the size using a plurality of mirrors.

More specifically, the illumination system 140 may include a plurality of mirrors 145, 146 disposed adjacent to one another, and the plurality of mirrors 145, 146 are disposed between the polarization forming unit 142 and the display element 132. Furthermore, a prism 147 may be disposed adjacent to the display element. The prism 147 is formed to reflect or transmit a light bundle entered from an inner oblique side thereof, and through this, the light bundle reflected on the mirror 146 is refracted toward the display element 132, and an image formed at the display element 132 is transmitted to the projection system 133.

The polarization forming unit 142 is disposed at an opposite side to the projection system 133 for magnifying and projecting the image by interposing a light bundle proceeding toward the plurality of mirrors 145, 146 during the implementation of two-dimensional images. Due to such a structure, polarized light formed at the polarization forming unit 142 is refracted by 180 degrees to enter the prism 147, and through this, it may be possible to configure a very compact optical system.

Figure 8:
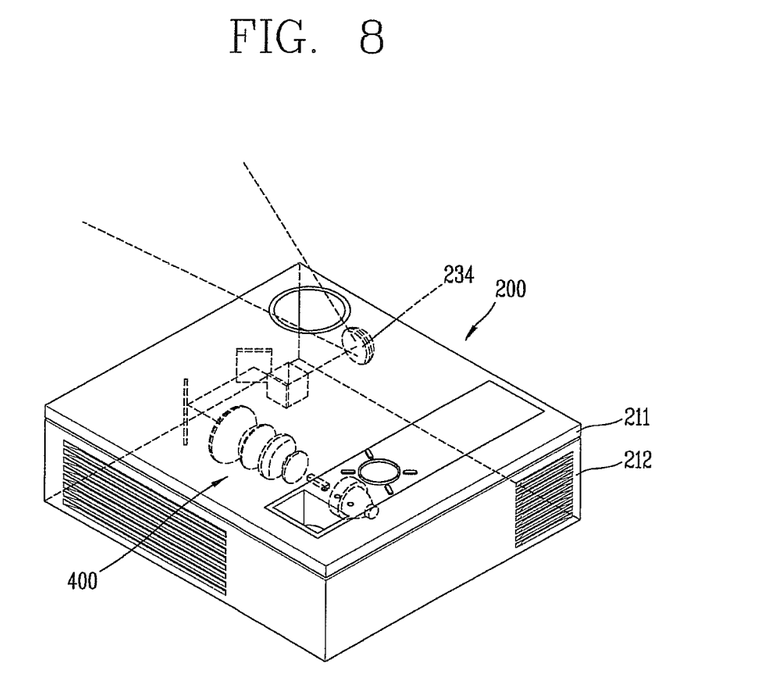
FIG. 8 is a perspective view illustrating an image projection apparatus according to another embodiment of the present disclosure.

The foregoing image projection apparatus may be applicable to various types of products. FIG. 8 is a perspective view illustrating an image projection apparatus according to another embodiment of the present disclosure.

According to the drawing, an optical system in FIG. 5 may be applicable to the implementation of a ultra short throw (UST) ratio optical system for projecting a large-sized screen in a configuration located adjacent to the screen. In this case, the projection unit 214 may be formed to project an image from an upper surface of the upper case 211 to the outside.

A light bundle exited from the projection system (not shown) is reflected on the mirror 234 toward the outside to implement a large-sized screen from a short distance at an end of the projection system (not shown). To this end, the mirror 234 is formed of a concave mirror.

As broadly described and embodied herein, an image projection apparatus may include a light source configured to generate a light bundle, a lens assembly, and a display element configured to form an image using the light bundle, the lens assembly being provided in a path of the light bundle between the light source and the display element, wherein the lens assembly includes a plurality of lenses provided to advance the light bundle toward the display element, and a polarizing optical device provided between the plurality of lenses to convert the light bundle into polarized light for producing stereoscopic images.

The plurality of lenses may include a concave lens provided on a path of the light bundle prior to the polarizing optical device to reduce an incident angle of the light bundle at the polarizing optical device. The plurality of lenses may include at least one convex lens disposed between the concave lens and the polarizing optical device.

The plurality of lenses may be disposed to form a stop, and the concave lens may be provided on the path of the light bundle prior to the stop. The concave lens may be configured to form an incident angle at the stop to be about 1° to 5.3°. Moreover, the polarizing optical device may be configured to be moved into a position corresponding to the stop.

The polarizing optical device may be configured to be moved into a path of the light bundle. The polarizing optical device may be configured to slidably move into a path of the light bundle. Moreover, the polarizing optical device may be configured to move in a direction perpendicular to the path of the light bundle.

The polarizing optical device may include a circular polarized shutter with a film patterned retarder (FPR) scheme. The polarizing optical device may be formed to sequentially convert the light bundle into a circular polarized light in a first direction and a circular polarized light in a second direction that is different than the first direction.

The image projection apparatus may further include a plurality of mirrors provided adjacent to one another, and provided along the path of the light bundle between the polarizing optical device and the display element. The plurality of mirrors may be configured to change the path of the light bundle by about 180°. A prism may be provided adjacent to the display element and configured to change the path of the light bundle by about 90°. A direction of the path of the light bundle after the prism can be about 90° relative to a direction of the path of the light bundle at the lens assembly.

The image projection apparatus may further include a projection system that magnifies and projects the image, wherein the projection system and the polarizing optical device may be disposed at opposite sides of the plurality of mirrors. The projection system is configured to project the light bundle in a direction at a prescribed angle relative to a plane corresponding to the path of the light bundle through the lens assembly and the plurality of the mirrors.

In one embodiment, an image projection apparatus may include a light source that generates a light bundle in a first direction, a first lens provided in a path of the light bundle in the first direction, a polarizing lens provided after the first lens in the path of the light bundle in the first direction to convert the light bundle into polarized light for producing stereoscopic images, a second lens provided after the polarizing lens in the path of the light bundle in the first direction, a display device to generate an image for projection using the light bundle, and a third lens provided to project the light bundle from the display device, wherein the path of the light bundle at the display device is in a second direction different than the first direction.

In this embodiment, at least one mirror may be provided after the second lens to change a direction of the light bundle from the first direction to the second direction. Moreover, a prism may be provided adjacent to the display device to change the direction of the light bundle from the second direction to a third direction which is different than the first and second directions. The polarizing lens may be configured to be movable into the path of the light bundle.

In one embodiment, an image projection apparatus may include a light source that generates a light bundle in a first direction, a plurality of lens provided in a path of the light bundle in the first direction, a display device provided in the path of the light bundle after the plurality of lens to generate an image for projection using the light bundle, a prism provided at the display device, and a projection lens provided in the path of the light bundle after the prism to project the light bundle from the display device, wherein the path of the light bundle at the display device is in a second direction different than the first direction.

According to an image projection apparatus having the foregoing configuration associated with the present disclosure, the polarization forming unit may be disposed between lens groups in a illumination system, thereby implementing stereoscopic images in a compact optical system. Furthermore, a concave lens may be disposed at a front side of the polarization forming unit, thereby limiting an incident angle of the light bundle entered into the polarization forming unit. Through this, it may be possible to prevent or alleviate optical efficiency reduction due to the polarization forming unit.

Furthermore, a illumination system according to the present disclosure may use a plurality of mirrors disposed adjacent to one another, thereby securing a space for the movement of the polarization forming unit and restricting the size of an optical system.

The configurations and methods according to the above-described embodiments will not be applicable in a limited way to the foregoing image projection apparatus, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image projection apparatus comprising:
   a light source configured to generate a light bundle;
   a lens assembly; and
   a display element configured to form an image using the light bundle, the lens assembly being provided in a path of the light bundle between the light source and the display element, wherein the lens assembly includes
   a plurality of lenses provided to advance the light bundle toward the display element and including a concave lens and at least one convex lens, and
   a polarizing optical device provided between the plurality of lenses to convert the light bundle into polarized light for producing stereoscopic images,
   wherein the plurality of lenses are disposed to form a stop, and the concave lens is provided on the path of the light bundle prior to the stop,
   wherein the polarizing optical device is located at a position corresponding to the stop, and
   wherein at least one of the convex lens is disposed between the concave lens and the polarizing optical device.

2. The image projection apparatus of claim 1, wherein the concave lens is provided on a path of the light bundle prior to the polarizing optical device to reduce an incident angle of the light bundle at the polarizing optical device.

3. The image projection apparatus of claim 1, wherein the concave lens is configured to form an incident angle at the stop to be about 1° to 5.3°.

4. The image projection apparatus of claim 1, wherein the polarizing optical device is configured to be moved into the position corresponding to the stop.

5. The image projection apparatus of claim 1, wherein the polarizing optical device is configured to be moved into a path of the light bundle.

6. The image projection apparatus of claim 5, wherein the polarizing optical device is configured to slidably move into a path of the light bundle.

7. The image projection apparatus of claim 5, wherein the polarizing optical device is configured to move in a direction perpendicular to the path of the light bundle.

8. The image projection apparatus of claim 1, wherein the polarizing optical device includes a circular polarized shutter with a film patterned retarder (FPR) scheme.

9. The image projection apparatus of claim 1, wherein the polarizing optical device is formed to sequentially convert the light bundle into a circular polarized light in a first direction and a circular polarized light in a second direction that is different than the first direction.

10. The image projection apparatus of claim 1, further including a plurality of mirrors provided adjacent to one another, and provided along the path of the light bundle between the polarizing optical device and the display element.

11. The image projection apparatus of claim 10, wherein the plurality of mirrors are configured to change the path of the light bundle by about 180°.

12. The image projection apparatus of claim 11, further including a prism provided adjacent to the display element and configured to change the path of the light bundle by about 90°.

13. The image projection apparatus of claim 12, wherein a direction of the path of the light bundle after the prism is about 90° relative to a direction of the path of the light bundle at the lens assembly.

14. The image projection apparatus of claim 10, further including a projection system that magnifies and projects the image, wherein the projection system and the polarizing optical device are disposed at opposite sides of the plurality of mirrors.

15. The image projection apparatus of claim 14, wherein the projection system is configured to project the light bundle in a direction at a prescribed angle relative to a plane corresponding to the path of the light bundle through the lens assembly and the plurality of the mirrors.

16. An image projection apparatus comprising:
    a light source that generates a light bundle in a first direction;
    a first lens provided in a path of the light bundle in the first direction, the first lens including a concave lens and at least one convex lens;
    a polarizing lens provided after the first lens in the path of the light bundle in the first direction to convert the light bundle into polarized light for producing stereoscopic images;
    a second lens provided after the polarizing lens in the path of the light bundle in the first direction;
    a display device to generate an image for projection using the light bundle; and
    a third lens provided to project the light bundle from the display device,
    wherein the path of the light bundle at the display device is in a second direction different than the first direction,
    wherein the first lens is disposed to form a stop, and the concave lens is provided on the path of the light bundle prior to the stop,
    wherein the polarizing lens is located at a position corresponding to the stop, and
    wherein at least one of the convex lens is disposed between the concave lens and the polarizing lens.

17. The image projection apparatus of claim 16, further including
    at least one mirror provided after the second lens to change a direction of the light bundle from the first direction to the second direction, and
    a prism provided adjacent to the display device to change the direction of the light bundle from the second direction to a third direction which is different than the first and second directions,
    wherein the polarizing lens is configured to be movable into the path of the light bundle.

* * * * *